United States Patent [19]

Shaw

[11] Patent Number: 5,276,744
[45] Date of Patent: Jan. 4, 1994

[54] ELECTRO-OPTIC DEVICE

[75] Inventor: Robert N. Shaw, Ipswich, England
[73] Assignee: BT&D Technologies Limited, Suffolk
[21] Appl. No.: 663,891
[22] PCT Filed: Sep. 20, 1989
[86] PCT No.: PCT/GB89/01099
§ 371 Date: Mar. 19, 1991
§ 102(e) Date: Mar. 19, 1991
[87] PCT Pub. No.: WO90/03594
PCT Pub. Date: Apr. 5, 1990

[30] Foreign Application Priority Data

Sep. 22, 1988 [GB] United Kingdom ............ 8822288

[51] Int. Cl.⁵ .................................. G02B 6/10
[52] U.S. Cl. ................................. 385/2; 385/8; 385/11
[58] Field of Search .............. 350/96.14; 385/2, 11, 385/8, 129, 130

[56] References Cited

U.S. PATENT DOCUMENTS

| | | | |
|---|---|---|---|
| 4,253,734 | 3/1981 | Komurasaki et al. | 350/386 |
| 4,703,996 | 11/1987 | Glass et al. | 350/96.14 |
| 4,903,029 | 2/1990 | Newberg et al. | 385/2 |
| 4,936,644 | 6/1990 | Raskin et al. | 385/2 |
| 4,936,645 | 6/1990 | Yoon et al. | 385/2 |
| 5,040,865 | 8/1991 | Chen et al. | 385/2 |

FOREIGN PATENT DOCUMENTS 0092181 10/1983 European Pat. Off.
57-185418 11/1982 Japan.
58-82223 5/1983 Japan.
61-99122 5/1986 Japan.

OTHER PUBLICATIONS

*Applied Optics*, vol. 22, No. 13, Jul. 1, 1983, "Traveling-wave electrooptic modulator", Gee et al.
*Applied Physics Letters*, vol. 44, No. 5, Mar. 1, 1984, "Microwave integrated optical modulator", Cross et al.
*Applied Physics Letter*, vol. 47, No. 3, Aug. 1, 1985, "Minimizing dc drift in LiNbO3 waveguide devices", Gee et al.
*Applied Physics Letter*, vol. 49, No. 19, Nov. 10, 1986, "Novel electro-static mechanism in the thermal instability of z-cut, etc." Skeath et al.
Quantum Electronics, Second Edition; Amnon Yariv, California Institute of Technology Electrooptic Amplitude Modulation; pp. 339–341; Jan. 1975.

Primary Examiner—Rodney B. Bovernick
Assistant Examiner—Robert E. Wise
Attorney, Agent, or Firm—Nixon & Vanderhye

[57] ABSTRACT

An electro-optic device, such as a Mach-Zehnder interferometer or a directional coupler, has a power dissipating electrode structure and a ground plane electrode, and is switchable between first and second distinct states by the application of respective first and second potentials to the power dissipating electrode. Thermally induced instabilities are minimized by biasing the ground plane electrode such that the first and second potentials are of substantially equal magnitude but of opposite sign. The power dissipating electrode may be a travelling-wave electrode connected to a 50 ohm transmission line.

11 Claims, 2 Drawing Sheets

ELECTRO-OPTIC DEVICE

BACKGROUND

I. Field of the Invention

This invention relates to electro-optic waveguide devices and in particular to interferometers and directional couplers having travelling-wave electrodes.

II. Prior Art and Other Considerations

Electro-optic materials, such as lithium niobate (LNB) and KTP, have refractive indices which vary according to the magnitude and direction of applied electric field. Waveguide devices based on such materials are potentially useful for optical fibre communication and signal processing systems. Typically such devices are required to operate with light of wavelengths in the range 0.6 to 1.6 μm, and in particular with light in the range 1.3 to 1.6 μm.

There are two basic device types: directional couplers; and Mach-Zehnder (MZ) interferometers. The first of these utilizes the electro-optic effect to control the coupling between a pair of adjacent waveguides. By controlling their refractive indices it is possible to couple light from one waveguide to the other or vice versa. In an MZ interferometer an input waveguide is coupled to an output waveguide by a pair of waveguide arms. Each arm has an associated electrode by means of which it is possible to control the refractive indices of, and hence the velocity of propagation in, the two arms independently. It is therefore possible, by controlling the applied electric fields, to produce phase differences between signals travelling in the two arms resulting in constructive or destructive interference when they are combined. Thus it is possible to amplitude modulate input optical signals according to the voltage difference between the electrodes.

Unfortunately, materials such as LNB, which exhibit the electro-optic effect tend also to be pyroelectric: electric fields are produced within the material as the result of a temperature change. With some materials, notably Z-cut LNB, the pyroelectric effect is so strong that a temperature change of a degree or less may be sufficient to produce an electric field comparable to that applied to produce switching of states in a directional coupler or MZ interferometer made of the material. Such electric fields strongly affect the optical states of the devices. Consequently it is necessary, with materials such as Z-cut LNB which exhibit a strong pyroelectric effect, to provide very precise temperature control if reliable and repeatable performance is to be achieved from electro-optic waveguide devices based on such materials. However, even with good control of environmental temperature effects, thermally-induced instabilities may remain in devices in which there is power dissipation in the electrodes.

Examples of devices with power dissipating electrodes include directional couplers and MZ interferometers having travelling-wave electrodes. The use of travelling-wave electrodes potentially enables the production of devices capable of very high speed operation (typically switchable at gigabit rates). A further advantage of such devices is that they offer a very large bandwidth, typically from dc to 4 GHz.

Because the travelling-wave electrode is part of a transmission line and has finite resistance, non-zero signal levels cause power to be dissipated in the electrode, thus raising the temperature of the underlying waveguide. The stability of these devices is jeopardised if there is in the electrical signal applied to the electrodes a low frequency component having a period longer than the thermal response time of the electrodes (of the order of 0.1 second) as such components cause variations in power dissipation and hence temperature fluctuations. This power variation can shift the transfer characteristic by as much as 3 volts or more which, the switching voltage being in the range 3.5 to 4.0 volts, makes the device unusable.

One solution to this problem which has been proposed is to decouple the travelling-wave electrode by inserting a capacitor (e.g. 47 nF) between the travelling-wave electrode and the transmission line termination to remove the dc component of the switching voltage. The capacitor is of course transparent at very high frequencies and therefore does not inhibit performance at such frequencies. At low frequencies the capacitor limits the charge passed by the travelling-wave electrode, limiting the power dissipation in both switching states and hence limiting temperature fluctuations. The disadvantage of this arrangement is that, in practice, the full bandwidth of the device will not be available, the device typically being unusable at switching frequencies in the range 1 MHz to 200 MHz. As a result the device user has to choose to operate the device from dc to a few MHz or from a few hundred MHz to 4 GHz.

It is an object of the present invention to provide a biasing arrangement which largely avoids the previously mentioned problems and disadvantages.

SUMMARY

According to the present invention there is provided a method of driving an electro-optic device having a power dissipating electrode structure comprising a power dissipating electrode and a ground plane electrode, the device being switchable between first and second distinct states by application of respective first and second potentials to the power dissipating electrode, characterised in that a bias voltage is applied to the ground plane electrode such that the magnitude of the current carried by the power dissipating electrode is substantially the same in which of said first and second states.

BRIEF DESCRIPTION OF THE DRAWINGS

Preferred embodiment of the present invention will now be described, by way of example only, with reference to the accompanying drawings in which.

DETAILED DESCRIPTION OF THE DRAWINGS

Figure 1:
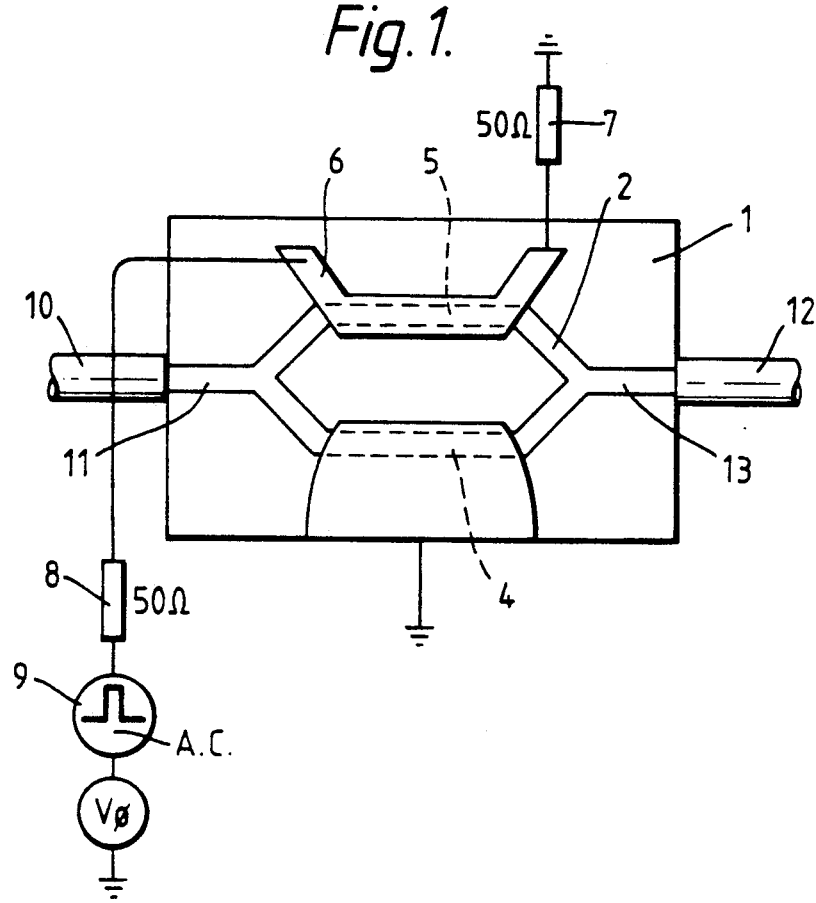
FIG. 1 is a schematic plan view of a conventional Mach-Zehnder interferometer having a travelling-wave electrode structure and its driving circuitry.

In FIG. 1 a typical travelling-wave electrode Mach-Zehnder interferometer is shown. The device is formed on a Z-cut lithium niobate (LNB) substrate 1, typically 40 mm long, 10 mm wide and 1 mm thick, and comprises a waveguide structure 2 formed by diffusing titanium into the LNB. A ground plane electrode overlies one of the interferometer arms 4 and is connected directly to ground. Over the other interferometer arm 5 there extends a travelling-wave electrode 6. One end of the travelling-wave electrode 6 is connected via a 50 ohm transmission line termination 7 to ground. The other end of the travelling-wave electrode is connected via a 50 ohm transmission line 8 to the modulating voltage source 9 the other pole of which is connected to ground. Optical input signals are supplied to the interferometer by an optical fibre 10 which is aligned with the waveguide input portion 11. The interferometer output is fed into a second optical fibre 12 aligned with the waveguide output portion 13.

Figure 2:
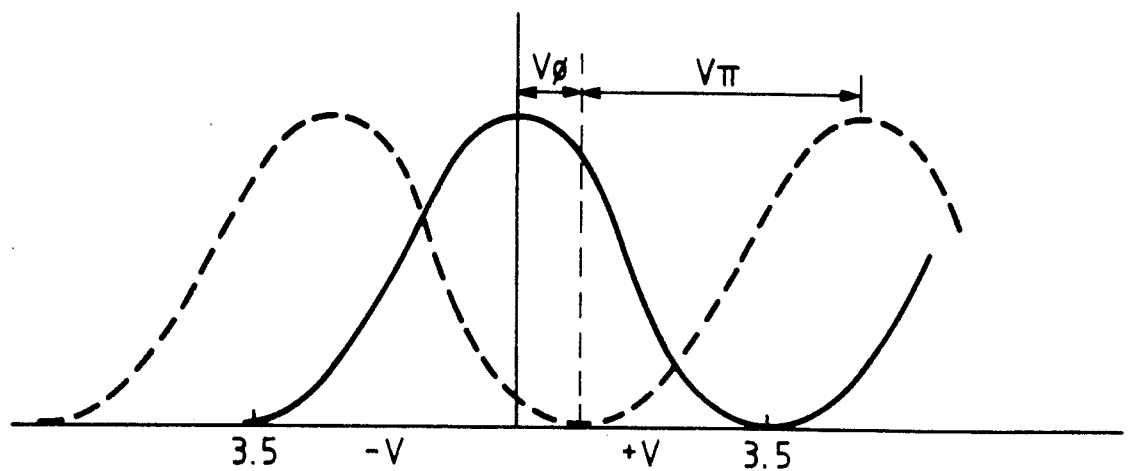
FIG. 2 shows the transfer characteristic of an interferometer such as that shown in FIG. 1.

FIG. 2 shows the transfer function of an interferometer such as that shown in FIG. 1. The transfer function is essentially of periodic cos squared type. For full modulation, the electrode potential (that is the potential difference between the travelling-wave electrode and ground potential) is switched so that the light output is switched between a peak and a trough or vice versa. The electrode voltage required to drive the output from a peak to a trough is called the switching voltage $V_\pi$. A typical switching voltage for 20 mm long electrodes on Z-cut LNB is about 3.5 V. The curve represented as a broken line corresponds to a typical transfer characteristic, where the light output null corresponds to a non-zero electrode potential. The voltage required to obtain the output null nearest to zero volts is the phase bias voltage Vo. The phase bias voltage can have any value up to the switching voltage and can vary widely from device to device, even when the devices are notionally identical. The worst case with regard to differences in power dissipation between the two switched states for any switching voltage occurs when the phase bias voltage Vo equals the switching voltage or is zero, as represented by the solid line curve in FIG. 2.

Figure 3:
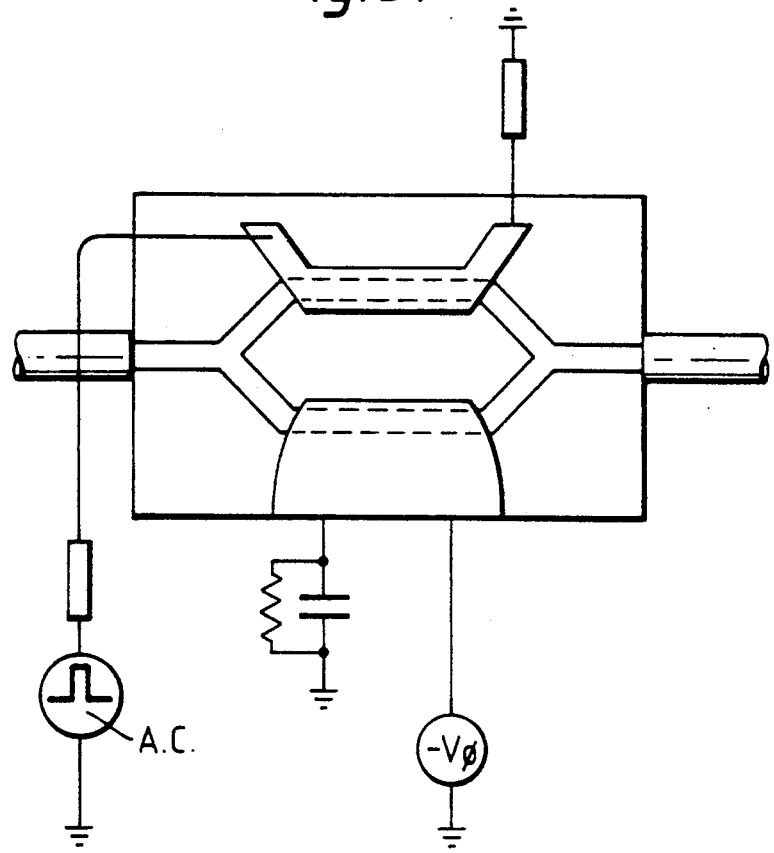
FIG. 3 is a schematic plan view of the interferometer of FIG. 1 modified according to the invention.
Figure 4:
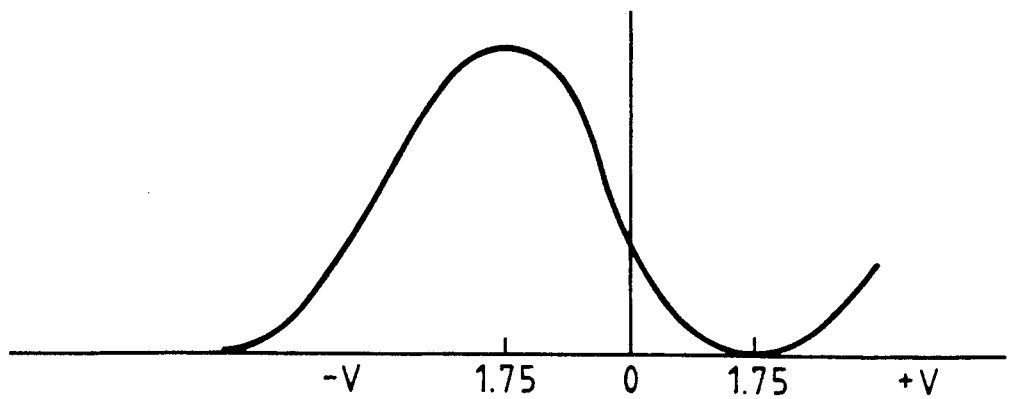
FIG. 4 shows the transfer characteristic of the interferometer of FIG. 3 operated according to the invention.

In FIG. 3 there is shown schematically a solution to the problem. As can be seen, the electrode driving arrangement is different to that employed conventionally and shown in FIG. 1. In particular the ground plane electrode is no longer connected directly to earth. Instead the ground plane electrode is connected to earth via a high frequency decoupling network, comprising a decoupling capacitor (e.g. 50 nF) and a resistor (e.g. 1K) in parallel. Also connected to the ground plane electrode is a voltage source which provides a bias voltage which is used to offset the device transfer characteristic relative to zero volts. Reference to FIG. 4 will facilitate understanding of what happens. The device of FIG. 3 has, like the device whose transfer characteristic appears as a solid line in FIG. 2, a switching voltage $V_\pi$ of 3.5 V. By applying a potential of −1.75 volts to the ground plane electrode the transfer characteristic is shifted so that a peak output occurs for a travelling-wave electrode potential of −1.75 volts, while a trough output occurs for a travelling-wave electrode potential of +1.75 volts. Because the travelling-wave electrode has a finite resistance, there is a voltage drop throughout its length and this must be borne in mind when measuring and quoting travelling-wave electrode potentials. It is convenient to use either the mean average electrode voltage of the median (mid-point) electrode voltage. Clearly, as the magnitude of the potential applied to the travelling-wave electrode is the same for both switched states of the device, the magnitude of the current flowing through the travelling-wave electrode and consequently the power dissipation will be the same in both states.

In addition to minimising any temperature fluctuations resulting from state switching, this arrangement has the added benefit that reductions in the worst-case direct current level in the travelling-wave electrode result in reduce electromigration with a consequent increase in electrode lift. The 50°/o reduction in direct current level in the present example would be expected to increase electrode life by about four times.

In practice, the necessary ground plane bias voltage can only be determined when the MZ interferometer is in thermal equilibrium, that is when the travelling wave electrode has been biased to $V_\pi/2$ for a sufficient period for thermal equilibrium to have been reached.

I claim:

1. Apparatus comprising an electro-optic device having a power dissipating electrode structure and a ground plane electrode, the device being switchable between first and second distinct states by the application of respective first and second potentials to the power dissipating electrode; and means for supplying said first and second potentials to said power dissipating electrode characterised in that the apparatus further comprises means to bias said ground plane electrode such that said first and second potentials are of substantially equal magnitude but of opposite sign.

2. Apparatus as claimed in claim 1 further comprising a high frequency decoupling network electrically connected to said ground plane electrode.

3. Apparatus as claimed in claim 1 wherein the power dissipating electrode is a travelling-wave electrode.

4. A method of driving an electro-optic device having a travelling wave electrode structure including a travelling wave electrode and a ground plane electrode, wherein a bias voltage is applied to the ground-plane electrode and first and second potentials of substantially equal magnitude but of opposite polarity are applied to the travelling wave electrode to enable switching by the full switching voltage $V_\pi$ to or from the phase bias point.

5. A method as claimed in claim 4 wherein said electro-optic waveguide device includes a waveguide overlain by said travelling wave electrode, said waveguide being formed in a nonsemiconductor pyroelectric material.

6. A method of driving an electro-optic device having a power dissipating electrode and a ground plane electrode, the device being switchable between first and second distinct states by the application of respective first and second potentials to the power dissipating electrode, characterised in that a bias voltage is applied to the ground plane electrode such that the magnitude of the current carried by the power dissipating electrode is substantially the same in each of said first and second states.

7. Apparatus comprising an electro-optic waveguide device having a waveguiding region formed in a pyroelectric material, and a travelling wave electrode structure including a travelling wave electrode and a ground plane electrode, the device being switchable between first and second distinct states by the application of respective first and second potentials to the travelling wave electrode; and means for supplying said first and second potentials to said travelling wave electrode, characterized in that the apparatus further comprises means to bias said ground plane electrode such that said first and second potentials are of substantially equal magnitude but of opposite sign.

8. Apparatus as claimed in claim 7 wherein the electro-optic device is a Mach-Zehnder interferometer.

9. Apparatus as claimed in claim 8 wherein the electro-optic device comprises lithium niobate.

10. Apparatus as claimed in claim 7 wherein the electro-optic device is a directional coupler.

11. Apparatus as claimed in claim 10 wherein the electro-optic device comprises lithium niobate.

* * * * *